US012562954B2

(12) United States Patent
Trivedi

(10) Patent No.: US 12,562,954 B2
(45) Date of Patent: Feb. 24, 2026

(54) SYSTEM AND METHOD FOR DIAGNOSIS AND SUPPRESSION OF ROOT CAUSES OF PERFORMANCE REQUIREMENT FAILURE IN A NETWORK

(71) Applicant: RAKUTEN MOBILE, INC., Tokyo (JP)

(72) Inventor: Vishvesh Trivedi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 624 days.

(21) Appl. No.: 17/801,301

(22) PCT Filed: Jun. 22, 2022

(86) PCT No.: PCT/US2022/034495
§ 371 (c)(1),
(2) Date: Dec. 28, 2023

(87) PCT Pub. No.: WO2023/249622
PCT Pub. Date: Dec. 28, 2023

(65) Prior Publication Data
US 2024/0205070 A1 Jun. 20, 2024

(51) Int. Cl.
*H04L 41/0631* (2022.01)
(52) U.S. Cl.
CPC ............................... *H04L 41/0631* (2013.01)
(58) Field of Classification Search
CPC .................................................. H04L 41/0631
USPC ........................................................ 709/224
See application file for complete search history.

(56) References Cited

U.S. PATENT DOCUMENTS

| | | | |
|---|---|---|---|
| 2015/0280969 A1* | 10/2015 | Gates | H04L 41/0631 714/37 |
| 2017/0005887 A1* | 1/2017 | Lad | H04L 12/4633 |
| 2018/0046928 A1* | 2/2018 | Jang | H04L 63/1416 |
| 2020/0042700 A1* | 2/2020 | Li | G06F 21/554 |
| 2020/0084087 A1* | 3/2020 | Sharma | H04W 24/08 |
| 2020/0409780 A1* | 12/2020 | Balasubramanian | G06F 9/3838 |
| 2021/0263945 A1 | 8/2021 | Siebel et al. | |
| 2023/0195557 A1* | 6/2023 | Gupta | G06F 11/0772 714/37 |

(Continued)

OTHER PUBLICATIONS

"value," Merriam-Webster.com, https://www.merriam-webster.com/dictionary/value (2025) (Year: 2025).*

(Continued)

*Primary Examiner* — David P Zarka
(74) *Attorney, Agent, or Firm* — Sughrue Mion, PLLC

(57) ABSTRACT

A system and method provide for identification, diagnosis, and suppression of performance requirement failure in a network. Portions of the network are evaluated to detect a collective failure of the portion to meet a predefined performance requirement. The portion can then be iteratively divided and each subportion similarly evaluated, until a root cause portion of the initially-detected collective failure is identified. Alternatively, upon detection of a failure to meet a predefined performance requirement, a series of cause performance requirements are iteratively evaluated until a root cause performance requirement is identified. In either instance, the root cause can then be suppressed.

20 Claims, 7 Drawing Sheets

(56)          References Cited

U.S. PATENT DOCUMENTS

2024/0220397  A1 *   7/2024  Mola ................... G06F 11/3644

OTHER PUBLICATIONS

International Search Report dated Dec. 2, 2022 issued by the
International Searching Authority in Application No. PCT/US22/
34495.
Written Opinion dated Dec. 2, 2022 issued by the International
Searching Authority in Application No. PCT/US22/34495.

* cited by examiner

Figure 5:
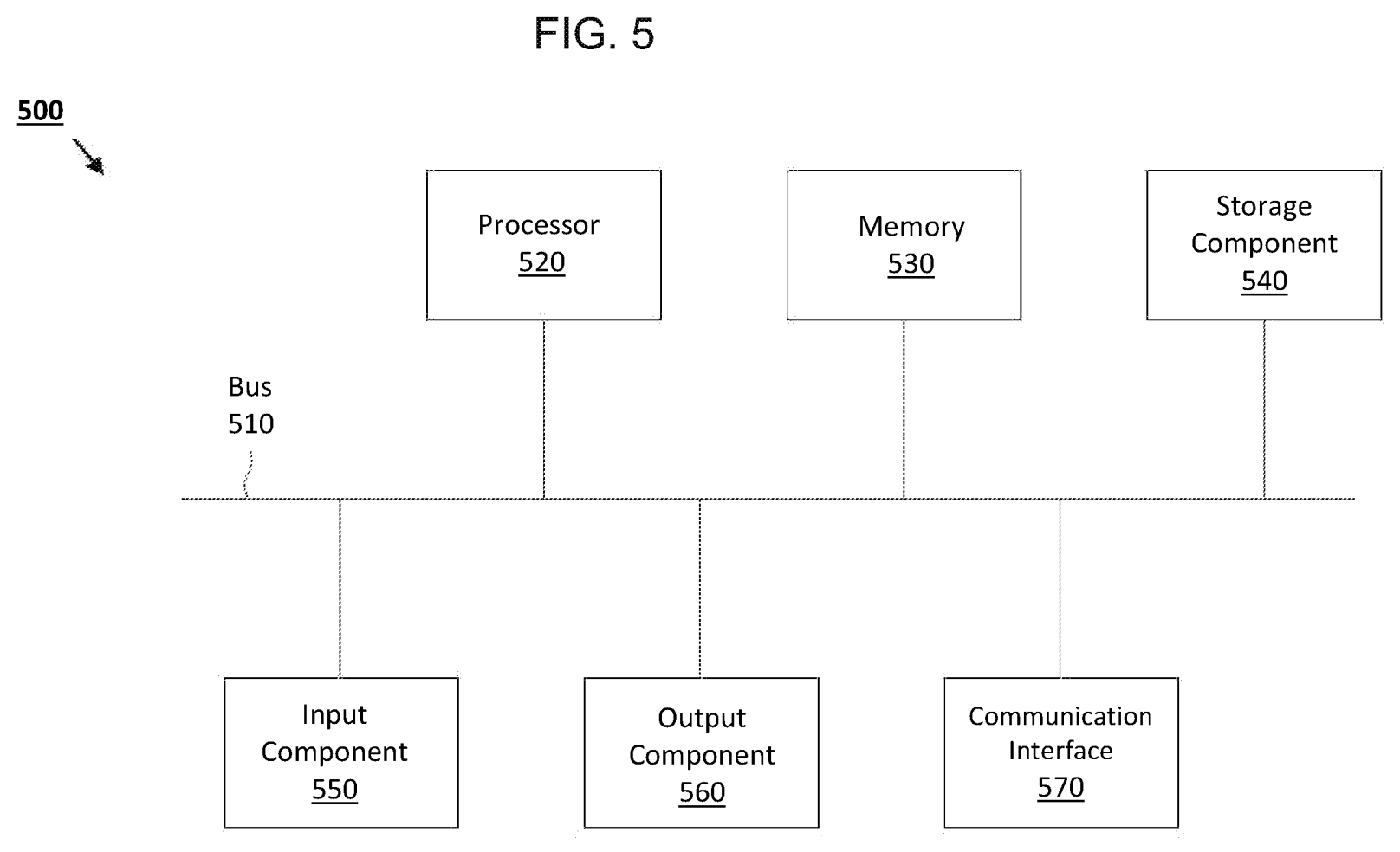

Storage
Component
540

Memory
530

Processor
520

Bus
510

Communication
Interface
570

Output
Component
560

Input
Component
550

SYSTEM AND METHOD FOR DIAGNOSIS AND SUPPRESSION OF ROOT CAUSES OF PERFORMANCE REQUIREMENT FAILURE IN A NETWORK

CROSS REFERENCE TO RELATED APPLICATIONS

This application is a National Stage of International Application No. PCT/US2022/034495, filed Jun. 22, 2022.

TECHNICAL FIELD

Apparatuses, systems and methods in accordance with one or more embodiments are generally directed to the efficient diagnosis of a root cause of performance requirement failure in a network, and the suppression of said root cause or the immediate effects thereof to restore a desired network performance. The system generally provides for a hierarchical evaluation of the network, dividing the task of evaluating portions of the network through either a portion-subportion or symptom-source approach, to reduce the amount of testing required to isolate the root cause.

BACKGROUND

Modern networked systems, such as mobile phone networks, Internet connections, and cloud computing systems, must manage interactions between a wide variety of third-party devices connecting to the system, and the servers and nodes to which they connect.

To ensure that the network operates within acceptable parameters, the provider of the network will regularly monitor activity on the network for malfunctioning components, connections and devices not in compliance with the system requirements, and other abnormalities and irregularities. Such irregularities are often detected through performance analysis and other testing. Once an issue has been identified, a proper response can be enacted to restore network performance to its preferred levels.

Many responses to such issues require or preferably involve identification of the ultimate source, or root cause, of the issue. This is generally known in the art as root cause analysis (RCA). The root cause can be an issue in a single node/cell, device, or network element, a cluster or other grouping of any of the above, or a general configuration error, among other possibilities. By targeting the root cause precisely, the response will be highly effective, will decrease the odds of recurrence, and will not itself be unduly disruptive to network operation.

When the network is sufficiently large, and especially when it used by paying clients who have been promised certain performance standards, it is important to identify the root cause as rapidly as possible so as not to leave the network disrupted for an unacceptable period of time.

SUMMARY

It is an object of the disclosed system and method to rapidly identify root causes of performance disruptions in a network, and to thereby respond in a targeted manner.

It is another object of the disclosed system and method to make the identification in a precise yet efficient manner even for large-scale networks, without over-burdensome processing requirements.

It is yet another object of the disclosed system and method to increase efficiency of the identification through a versatile approach that can take many forms according to the nature of the initially-detected performance disruption.

These and other objects may be attained in a system and method for diagnosis and suppression of root causes of performance requirement failure in a network.

In accordance with certain embodiments of the present disclosure, a method is provided for diagnosis and suppression of a root cause of performance requirement failure in a network. The method includes evaluating an initial portion of a network to detect a collective failure of the initial network portion to meet a predefined performance requirement, such that the initial network portion is identified as a failing network portion. The method further includes iteratively dividing the failing network portion to evaluate sub-portions thereof for collective failure to meet the performance requirement, and thereby identify a failing network portion of smaller size for a later iteration of division. The method further includes suppressing a root cause of the collective failure of the initial network portion to meet the performance requirement upon identification of the root cause.

In accordance with other embodiments of the present disclosure, another method is provided for diagnosis and suppression of a root cause of performance requirement failure in a network. The method includes evaluating at least a portion of a network to detect a failure of the network portion to meet an initial predefined performance requirement, such that the initial performance requirement is identified as a failing performance requirement. The method further includes iteratively identifying possible cause performance requirements of the failing performance requirement, and evaluating the network portion to identify a failure of the network portion to meet one of the possible cause performance requirements, such that the possible cause performance requirement that the network portion failed to meet is identified as a failing performance requirement for a later iteration. The method further includes suppressing a root cause of the failure of the network portion to meet the initial performance requirement upon identification of the root cause.

In accordance with yet other embodiments of the present disclosure, a system is provided for efficient identification and suppression of performance requirement failure in a network. The system includes a database implemented in a computer memory and configured to store monitoring data describing the behavior of a network. The system further includes a requirement evaluation module executing on a processor and configured to evaluate provided monitoring data representing a portion of the network to thereby detect a collective failure of the represented portion of the network to meet a selected performance requirement. The system further includes at least one suppression module executing on a processor and configured to execute suppression of failure of a corresponding performance requirement in the network. The system further includes an iteration control module executing on a processor and configured, responsive to the requirement evaluation module detecting a collective failure of a portion of the network to meet a selected performance requirement, to selectively actuate the network portioning module, responsive to the failing portion of the network being larger than a predetermined size, to provide monitoring data representing at least one subportion of the failing portion of the network to the requirement evaluation module, and to selectively actuate the suppression module, responsive to the failing portion of the network being of the predetermined size or smaller, to execute suppression of failure upon the failing portion of the network.

In accordance with still other embodiments of the present disclosure, a non-transitory computer-readable recording medium is provided, having recorded thereon instructions executable by at least one processor to perform a method of configuring a network for onboarding of a plurality of devices. The method includes evaluating an initial portion of a network to detect a collective failure of the initial network portion to meet a predefined performance requirement, such that the initial network portion is identified as a failing network portion. The method further includes iteratively dividing the failing network portion to evaluate subportions thereof for collective failure to meet the performance requirement, and thereby identify a failing network portion of smaller size for a later iteration of division. The method further includes suppressing a root cause of the collective failure of the initial network portion to meet the performance requirement upon identification of the root cause.

Additional aspects, details, and advantages of the disclosed system and method will be set forth, in part, in the description and figures which follow.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 5 is a diagram of components of one or more devices, in accordance with an exemplary embodiment of the present invention.

DETAILED DESCRIPTION

Figure 1:
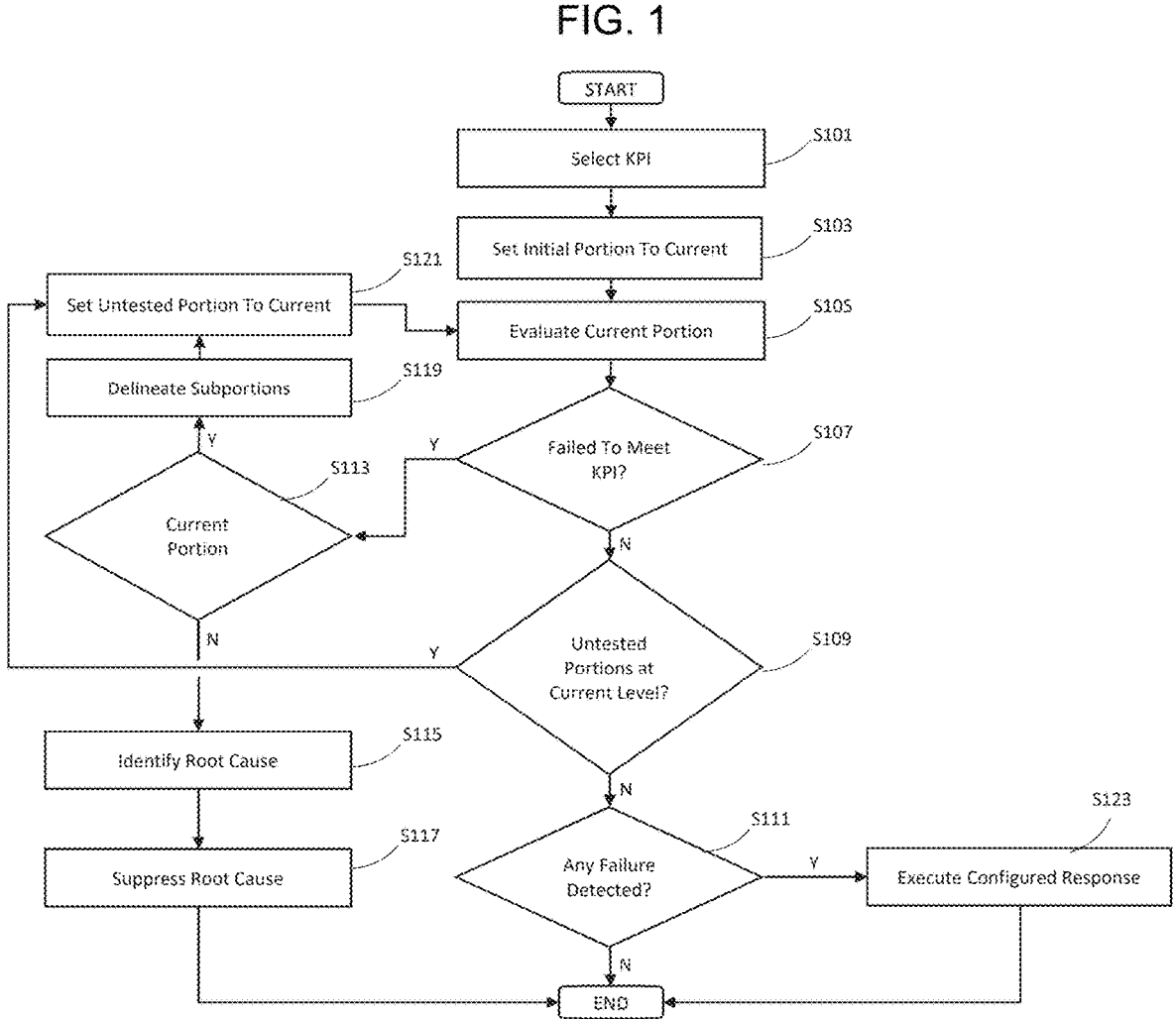
FIG. 1 is a flow diagram illustrating a flow of processes for diagnosis and suppression of a root cause of performance requirement failure in a network, in accordance with an exemplary embodiment of the present invention.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to all forms of networks, including but not limited to internet service provider networks such as optical fiber and cable networks; traditional phone networks; and both wired and wireless networks in a structure, complex, or other localized area. However, throughout the disclosure, the network being analyzed and managed by the disclosed system will be primarily referred to as a mobile network for convenience and clarity purposes.

As discussed briefly in the background of this disclosure, performance of a network, its components, and the devices connected thereto must be monitored thoroughly and regularly, to reduce degradation and interruptions. The monitoring can include testing network activity to see if it meets various predefined performance requirements. These performance requirements are sometimes termed key performance indicators (KPIs). For convenience, the terms "KPI" and "performance requirement" will be used interchangeably throughout this disclosure.

For convenience and brevity, a case where tested network activity shows success at meeting a requirement established by a KPI will sometimes be described herein as "meeting the KPI" or simply "KPI compliance," while a case where tested network activity shows failure to meet a requirement established by a KPI will sometimes be described herein as "failing to meet the KPI" or "failure of the KPI." For further convenience and brevity, the network or network portion which meets or fails to meet the KPI will be omitted from descriptions of such compliance or failure when irrelevant or when clear from context.

Examples of KPI in a mobile network context can include, but are by no means limited to, node availability (or unavailability), response time, packet loss, data throughput, total traffic, Short Message Service (SMS) traffic and/or message count, Rich Communication Services (RCS) voice traffic, RCS call attempts, and physical resource block (PRB) utilization, each according to various goal values that can be met or not met by the network activity or performance. A goal value is a threshold value which is set as part of an evaluation test for the KPI, and which can be a minimum, maximum, or exact target value as suitable to the nature of the KPI. Therefore, depending on the above context, "KPI compliance" can mean any of matching the target value, matching or exceeding the target value, or matching or falling below the target value.

Analysis of the network for compliance with performance requirements can be done in one or two stages. In a single-stage approach, the network components are directly checked for particular behaviors. In a two-stage approach, the network components are monitored generally and various aspects of their activity are recorded to a database, and the contents of the database are later reviewed for the particular behaviors. As it is not practical to continuously check for failure to meet thousands of KPIs, and as many relevant behaviors can only be recognized in the form of behavior over time, the two-stage approach is preferred in most contexts.

According to the principles of root cause analysis (RCA), this monitoring and corresponding analysis seeks to quickly identify the source behavior that is the root cause of a KPI failure or other irregularity. The irregularity can then be addressed by suppressing the behavior using various techniques known in the art.

Effective RCA becomes a challenge at larger scales. Detecting which of thousands, or even millions, of devices, nodes, and connections is the ultimate culprit for a disruption requires a correspondingly large amount of processing power when using traditional approaches.

Consider a set of monitoring operations designed to identify whether a network is meeting all KPIs. Each monitoring operation, or test, evaluates whether a given KPI requirement is being met by a given node or cell. Even though testing whether an individual node meets a KPI requirement can, in many circumstances, be done rapidly, repeating that test for each node in a large network against that one KPI requirement could still take hours. Under this approach, the network as a whole is only tested against the given KPI as quickly as the system can complete all the individual tests or checks.

Fully testing the network for a critical issue only once every few hours is in at least some cases intolerably slow, as leaving such an issue undetected for such a long period can be highly disruptive to network performance. However, using the above approach of individual testing, the only solution is to increase the processing power of the testing so that it can be completed faster.

A possible solution is to broaden the testing. Many KPIs can be tested on a wider scale: rather than check nodes individually, a group of nodes can be tested in the aggregate. For example, all nodes in a geographic region, all nodes of a particular node or cell type, all nodes operating on a particular technology or domain, or indeed all nodes in the network itself, can be collectively tested. More possible groupings will be described further herein.

It has been determined that such aggregate testing is on the same scale of processing requirements as testing any one node. That is to say, as an example, it is not considerably slower to test a network all at once for KPI compliance than to test a specific node of that network. The corresponding downside, however, is that any detected problems are only known to exist somewhere in the entire network, which does not provide sufficient information for the traditional suppression techniques of RCA to be effective. Primarily for this reason, wide-scale, aggregate testing is not understood in the art to be a suitable method of identifying a proper RCA response.

Example embodiments of the present disclosure provide a hierarchical analysis, which starts at a high aggregation level but, if an issue with a particular KPI is detected, performs an additional test on each of a set of smaller aggregations.

Again, consider testing an entire network in the aggregate for compliance with a KPI. For convenience, such KPI test will be termed an initial or "parent" condition test for that KPI. Consider further an example where the test determines that the network fails to meet requirements for a given KPI, which for convenience will sometimes be termed the requirement at issue herein. At this stage, it can be determined that some component of the network is the cause of the failure to meet the requirement at issue.

The network is therefore divided into a set of smaller "child" groups of components. Each of these groups is then tested in a series of additional or "child" condition tests using the same testing process for the requirement at issue as used for the "parent" condition test. It is then determined which of these child groups shows the same failure to meet the requirement at issue.

Depending on the most likely causes of failure for the particular requirement at issue, the division into groups can take different forms: the components can be divided into geographic regions (if, for example, a blackout is a likely cause, as blackouts are usually localized) or by component vendor (if a change in the operations or hardware of a cell phone vendor is a likely cause), among other possibilities. The preferred division can be predetermined and preset for any given failure condition of the testing.

As will be apparent from the disclosure thus far, further division is possible and will continue to isolate the root cause of the failure condition. That is, the child group that failed the test can itself be divided into still smaller groups, which can be tested in turn. Continuing this division process will ultimately arrive at the root cause component itself, such as an individual node, cluster, or network element, or at a small enough grouping of components that suppression techniques will be sufficiently effective and precise to resolve the issue without unduly disrupting other portions of the network.

This new RCA process operates on the order of O(log(n)) (more specifically, roughly $O(\log_x(n))$ if it is assumed that each division creates "x" child groups), in comparison to O(n) as required for a full testing of all individual nodes in the network. For a network comprising millions of nodes, the resulting savings in time and processing power is considerable, at minimal to no loss of accuracy in identifying and responding to the root cause.

A variation on the above approach exploits the fact that failure to meet certain KPIs will always result in a failure to meet other KPIs. To put it another way, a failure to meet one KPI can be an inevitable "symptom" of failure to meet another, "source" KPI, and if the symptom is not present then the source will not be either. It is therefore not necessary to test whether there is a failure of the source KPI, but only whether there is a failure of the symptom KPI, and then a failure of the source KPI can be assumed. It is noted that a "source" KPI might not normally be treated as a KPI or other performance requirement—for example, might not normally be tested for in normal operations. However, as it is assumed the "source" KPI always leads to failure of its corresponding "symptom" KPI, for the purposes of this disclosure the "source" KPI is by definition also a performance requirement of the network, and will be described as a KPI for convenience herein.

Further expanding on the above, certain KPI failures can be a symptom of any of several source KPI failures: for example, of a first source, a second source, and a third source. If any of the three source KPIs fails, the symptom KPI will also fail. While it is not possible to simply assume which of the three is the correct source in such circumstances, it is only necessary to test for failure of any of the three source KPIs after a failure of the symptom is detected. This is similar to the division process described above, with the symptom treated as the parent condition and the sources treated as child conditions. Inversely, a failure of the network to meet a KPI can be thought of as a symptom of a portion of the network to meet the same KPI.

Furthermore, in certain circumstances a symptom can be the source of another symptom. It may therefore be possible to chain KPIs back from a final symptom to one of several sources through various interim symptoms, testing at the "final symptom" level first and working back through other symptoms to the source.

This variation is more limited than the division of in that it is not always intuitive whether one KPI failure inevitably leads to any other KPI failure, but it has uses in certain circumstances. Two non-limiting examples in the context of a mobile network are that failure of a core network router KPI inevitably leads to failure of various RAN network traffic KPIs, and that failure of a PRB utilization KPI (that is, when utilization is too high) inevitably leads to failure of throughput KPIs.

The principle behind the division approach and the source-symptom approach can be summarized by the statement: If $X_1$ or $X_2$ or $X_3$ or . . . $X_n$, then Y; therefore, if not Y, then not $X_1$ and not $X_2$ and not $X_3$ and . . . not $X_n$ It is only necessary to test for any of $X_1$ through $X_n$ (whether they be source KPIs or a KPI in a divided portion of the network) if it is first determined that Y is true; otherwise, each of $X_1$ through $X_n$ can be assumed false and need not be tested.

A flow of processes for diagnosis and suppression of a root cause of performance requirement failure in a network will now be described with reference to FIG. 1, according to an embodiment of the invention.

At S101, a KPI, or other predefined performance requirement, is selected for testing on the network. Many suitable selection means are known in the art, with one non-limiting example being an interface which will be described further herein with reference to FIGS. 4A-4C.

At S103, an initial portion of the network is selected as a current portion for evaluation against the selected KPI. The initial portion can be the entire network, or any portion thereof. Again, a non-limiting example of a suitable selection means is the interface which will be described further herein with reference to FIGS. 4A-4C.

The remainder of the flow describes an iteration of portion evaluation and division, and will be explored according to four possible outcomes:

1. the initial portion of the network meets the KPI,
2. the initial portion of the network fails to meet the KPI and there are no relevant subportions to divide the initial portion into, 3. the initial portion of the network fails to meet the KPI and there are relevant subportions to divide the initial portion into,
4. the initial portion of the network fails to meet the KPI and the failure is not traceable to a root cause at a lowest level of division.

According to the first possible outcome, at S105, the currently selected portion of the network (which is, in the first iteration, the initial portion) is evaluated against the selected KPI, to see if the KPI is met. In a preferred embodiment, data regarding network activity has already been stored to a database, and is sufficient to determine whether any given portion of the network meets the KPI; the evaluation can therefore be a simple review of appropriate contents of the database. However, embodiments where the network activity is evaluated directly are within the scope of the invention.

At S107, it is checked whether the currently selected portion collectively met or failed to meet the KPI. For a typical KPI, this will be a comparison of a determined value for a factor to a value of another factor, a predetermined target value, or a target value derived from the value of another factor, although other forms of KPI checks are known in the art and include but are not limited to "worst neighbor" determinations and performance-over-time trend evaluations. Again, for this exploration of the process flow, it is assumed that the currently selected portion (that is, the initial portion) did meet the KPI, and therefore the flow proceeds to S109.

At S109, it is checked whether there are portions at the current level of division which have yet to be tested. For example, if the current level consists of three portions (which are subportions of a portion of a previously tested level), it is checked whether all three of those portions have been evaluated in an iteration of S105 and S107. Because the currently selected portion is the initial portion, the current level of division is an initial level of division, and contains only the initial portion and no other portions. Therefore, there are no portions at the current level of division which have yet to be tested (and indeed no other portions at all), and the flow proceeds to S111.

Optionally, at S111, it is checked whether any KPI failure has been detected for any portion. Because none has been detected, no further measures are needed, and the process simply ends.

Optionally, the results of the KPI test—that the initial portion of the network met the KPI—may be outputted in any suitable manner. The process may then be repeated with another KPI.

According to the second possible outcome, at S105, the currently selected portion of the network (which is, in the first iteration, the initial portion) is evaluated against the selected KPI, to see if the KPI is met. In this outcome, the initial portion of the network fails to meet the KPI. Therefore, at S107, the process does not continue to S109, but instead to S113.

At S113, it is checked whether the currently selected portion of the network (which is, in the first iteration, the initial portion) can be divided into subportions that are relevant to the KPI. In the second outcome, no such subportions exists. This can be because the currently selected portion is already at the smallest scale or portion size for which the KPI is relevant or detectable: for example, a single node, cluster, or network element. This can also be because the currently selected portion is already at a scale or portion size at which effective suppression techniques for failure of the selected KPI can be deployed; such a portion size can be predetermined and pre-set for the KPI in a configuration process. Other reasons are also possible and within the scope of the invention.

Regardless of the reason, if the currently selected portion of the network cannot be divided according to S113, at S115 the root cause is identified to be the currently selected portion, or the behaviors of that portion, as appropriate to the KPI. Therefore, suitable suppression techniques for a failure of the KPI are preferably executed against the currently selected portion at S117. Such suppression techniques for a given KPI or other performance requirement are generally known in the art of RCA and will not be detailed herein. The suppression technique to be employed is preferably pre-set for the KPI at issue, and optionally for the size of the current portion, according to the configuration of the system. The process then ends.

Optionally, the results of the KPI test—that the currently selected portion failed to meet the KPI and suppression was executed appropriately—may be outputted in any suitable manner. The process may then be repeated with another KPI.

According to the third possible outcome, at S105, the currently selected portion of the network (which is, in the first iteration, the initial portion) is evaluated against the selected KPI, to see if the KPI is met. In this outcome, the initial portion of the network fails to meet the KPI. Therefore, at S107, the process continues to S113 as in the second outcome.

At S113, it is checked whether the currently selected portion of the network (which is, in the first iteration, the initial portion) can be divided into subportions that are relevant to the KPI. In the third outcome, the currently selected portion can be divided into smaller, relevant subportions.

The subportions can be of at least approximately equal size or scale, as measured by number of nodes, components, network elements, or covered area, but this is by no means a requirement. As one counterexample, the currently selected portion of the network might be conveniently divisible into geographic or political regions, notwithstanding that such regions frequently have disparate sizes according to one or all measures. As another counterexample, the currently selected portion of the network might be formally organized, and therefore conveniently divided, by management systems controlling particular aspects thereof, notwithstanding that the subportions under the control of the various systems might have disparate sizes according to one or all measures. As still another counterexample, if the currently selected portion of the network contains nodes, components, or network elements manufactured by different vendors, the portion can be divided by vendor, notwithstanding that any given vendor might have manufactured considerably more components in the current network portion than the others.

It is also noted that the form of the division can be changed between iterations. As but one arbitrary example, the first division might be of a nationwide network into general geographic regions, the second into individual states, provinces, or prefectures, the third into management system control regions, and the fourth and further into geographically contiguous portions each having an equal number of nodes.

As previously noted, the form of the division (or of each division at each iteration) can in certain embodiments depend on the selected KPI, and can be predetermined and pre-set for the KPI in a configuration process.

Because division is determined to be possible at S113, the process continues to S119, where the currently selected portion is divided and the subportions are delineated. The subportions are designated as portions of the same "level" of division, one level below the previous level, for reasons that will become apparent. At S121, one of the unevaluated portions at the newly current level is selected as a new currently selected portion, and the process returns to S105 to evaluate this new currently selected portion as it did the previous selected portion.

If the new currently selected portion is determined at S107 to meet the KPI, then at S109, it is determined whether there are other portions at the current level of division which have not yet been evaluated at S105. If so, the process returns to S121, where one of the remaining unevaluated subportions is selected as a new currently selected portion. The process returns to S105 to repeat as described above.

It can be seen from the above description that the process will move through the subportions at the current level until it determines at S107 that one has failed to meet the KPI.

It can also be seen from the above description that, if the new currently selected portion is determined at S107 to fail to meet the KPI, and there are relevant divisions to the new currently selected portion as determined at S109, the new currently selected portion is equivalent to an initial portion of the third outcome. It can further be seen from the above description that, if the new currently selected portion is determined at S107 to fail to meet the KPI, and there are no relevant divisions to the new currently selected portion as determined at S109, the new currently selected portion is equivalent to an initial portion of the second outcome. In both situations, the processes for those outcomes operate as described above.

The process as illustrated in FIG. 1 thereby operates as a whole as follows: each level is evaluated for KPI failure, one portion at a time, and if a KPI failure is identified, it is divided to generate a new level, which is also evaluated in the same manner. This iteration of the process continues until the failing network portion cannot be further divided, at which point the root cause is identified and, preferably, suppressed appropriately.

In certain circumstances, the fourth outcome may arise. This can occur due to system error, where a KPI failure was incorrectly detected for a given portion and the actual root cause is down a different "branch" of divisions. This can also occur for particular KPIs which sometimes become undetectable at too small a scale, yet their root cause cannot be identified with ideal precision at a larger scale; that is, the process continues to divide at S113 and S119 in an attempt to attain more precision that might not be available.

For the fourth outcome, at a level of division other than the level of the initial portion, all portions at that level meet the KPI, despite the portion at the previous level from which these portions were divided (for brevity, their "superportion") failing to meet the KPI. Therefore, at S109, it is determined that no further portions at the current level still require evaluation, and the process continues to S111. However, at S111, it is determined that a KPI failure was detected during the process, namely, that of the superportion for the present level. The process therefore does not end, but moves to S123.

At S123, a suitable response is executed to the fourth outcome, which is preferably pre-set for the KPI at issue, and optionally for the size of the current portion (or superportion), according to the configuration of the system. Depending on the nature of the KPI, the present level of division, and the corrective measures normally executed to suppress failure to meet the KPI, suitable responses can include but are not limited to: execution of the standard suppression measure for the KPI against the superportion (under the assumption that the KPI failure has become undetectable at the current scale), execution of a different (preferably, less disruptive) suppression measure against the superportion (under the same assumption), returning to the superportion to evaluate other portions at the same level as the superportion for KPI failure (under the assumption that the detection of KPI failure of the superportion was in error), or sending an alert to an administrator or other user for human evaluation and manually-executed response.

Once the response is executed at S123, the process ends. Optionally, the results of the KPI test—that the currently selected portion failed to meet the KPI—may be outputted in any suitable manner. The process may then be repeated with another KPI.

In a modification of the above flow of processes that is within the scope of the invention, the testing at a given level does not cease as soon as one of the portions at that level fails to meet the KPI; instead, it is assumed possible that multiple portions fail rather than just one. This modification can result in the identification of multiple root causes, all of which will be suppressed accordingly.

Figure 2:
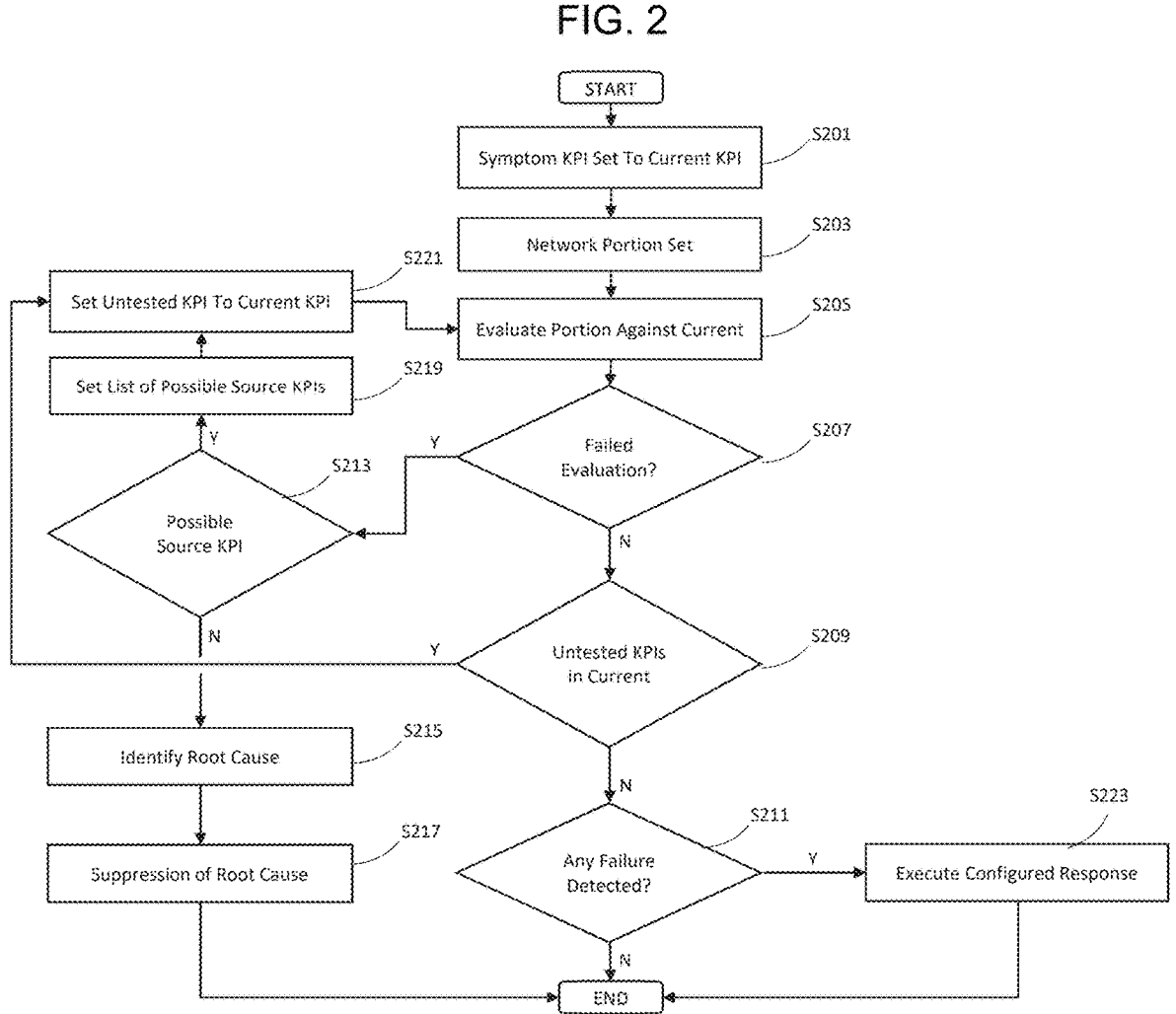
FIG. 2 is a flow diagram illustrating a modification of the flow of processes of FIG. 1, in accordance with an exemplary embodiment of the present invention.

It is noted that the flow of processes illustrated in FIG. 1 can be modified to the source-symptom approach described earlier. One such modification is illustrated in FIG. 2. As will be apparent from FIG. 2, the modified flow of processes is similar in many respects, with the following changes:

S201 is similar to S101, but more specifically selects an initial "symptom" KPI as a currently selected KPI.

S203 is essentially the same as S103, but the initially selected portion of the network will remain the currently selected portion throughout the flow of processes.

S205 is similar to S105, but more specifically evaluates the currently selected portion (which is always the initial portion) against the currently selected KPI.

S207 is essentially the same as S107.

S209 determines whether there are additional sources to evaluate in the current "list" of KPIs, which will be defined further herein. For the first iteration, the "list" of KPIs is simply the current KPI.

S211 is essentially the same as S111.

S213 determines whether there is at least one possible "source" KPI of the currently selected KPI. S219 provides a list of these possible source KPIs and sets it as the current list of KPIs, and S221 selects an unevaluated KPI from this list.

It is also noted that, unlike the subportions in a division approach, such as illustrated in FIG. 1, there might be one and only one KPI on a level; that is, a KPI might have exactly one possible source KPI. In such a case, the next iterations of S205 and S207 will in certain embodiments simply assume that this single source KPI will fail (because its symptom KPI failed), and the flow of processes will go straight to the next iteration of S213 to determine whether there is a further level of sources to evaluate.

S215 identifies the root cause of the initially selected KPI to be the currently selected KPI.

S217 is essentially the same as S117, but the specific suppression technique used to resolve the failure of the (root cause) KPI may be different than it would be for the same KPI at S117, due to being potentially deployed against a much larger portion of the network. Likewise, S223 is essentially the same as S123, but the applied configuration rules may be different.

It will be apparent to those of skill in the art that the processes in FIGS. 1 and 2 can be combined. That is, the flow of processes can determine both a root cause portion and a root cause KPI on the basis of an initial portion and an initial KPI, by both dividing the portion into subportions and working from symptom to source. Either may be managed first; a process which alternates between division and symptom-cause is also within the scope of the invention.

Figure 3:
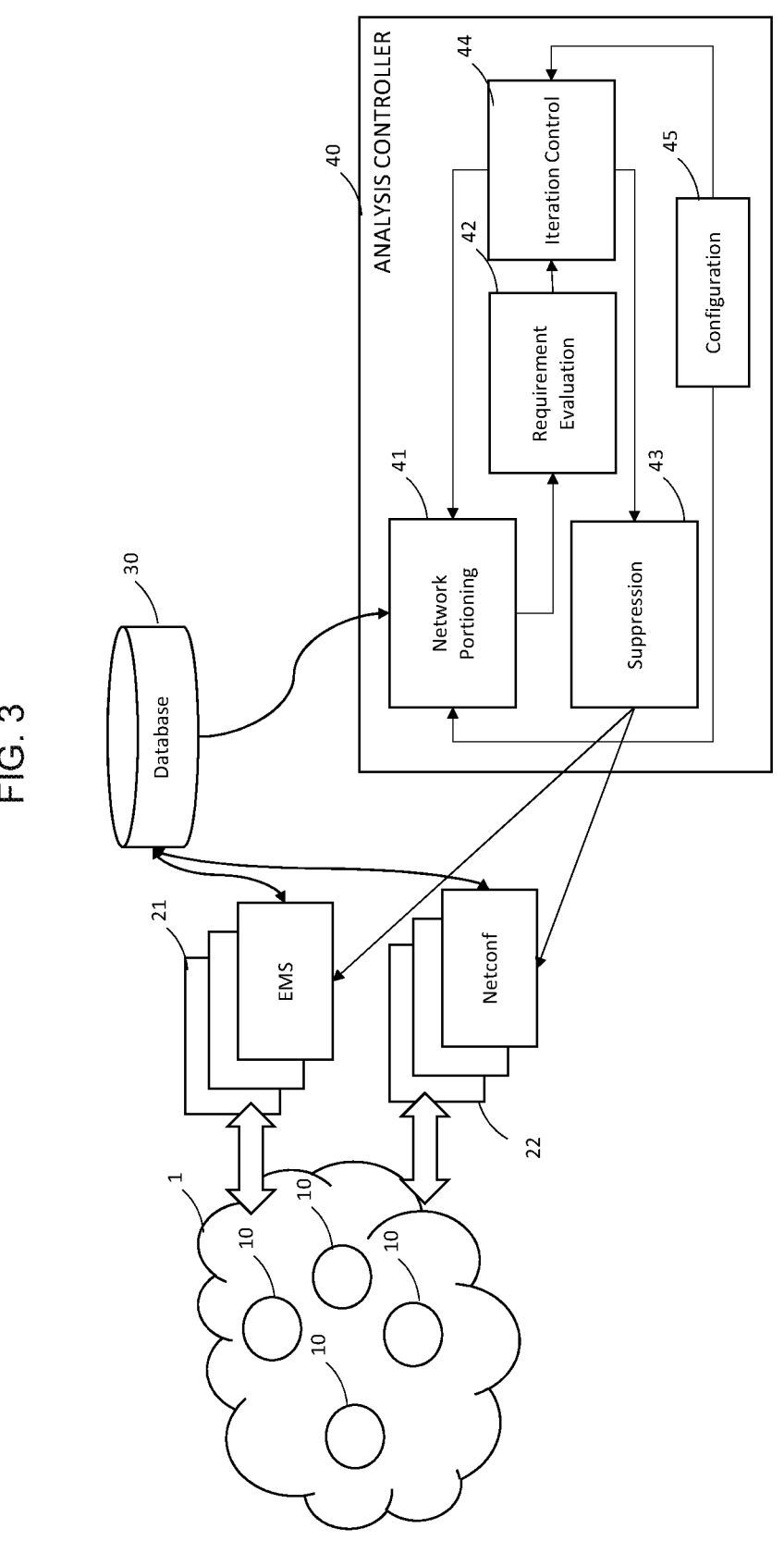
FIG. 3 is a block diagram illustrating a system for diagnosis and suppression of a root cause of performance requirement failure in a network, in accordance with an exemplary embodiment of the present invention.

An illustrative diagram of a system architecture for diagnosis and suppression of a root cause of performance requirement failure in a network will now be described with reference to FIG. 3, according to an embodiment of the invention.

The network 1 contains a plurality of network elements 10, each representing a group of physical devices which, for convenience, are grouped together as a single unit for management purposes. For example, such network elements may connect to the network through a single connection point, such as a node.

The network 1 is managed by a set of element management system (EMS) 21 and netconf controllers 22, which manage the configuration and security of connections to the network elements 10 through LTE and 5G connections, respectively. For the purposes of the present disclosure, both EMSs 21 and netconf controllers 22, as well as other systems known in the art to be suitable for such management of network elements 10, will be treated interchangeably herein.

The EMSs 21 and netconf controllers 22 also monitor the behavior of the network elements 10 and the individual devices and components thereof, and supply monitoring data describing this behavior for storage in a database 30.

An analysis controller 40, which can be a processor executing software code, accesses the monitoring data stored in the database 30 for analysis, and executes operations upon this monitoring data, such as, in certain embodiments, the flows of processes described with respect to FIG. 1 and/or FIG. 2.

The software code executed on the analysis controller 40 preferably includes a network portioning module 41, which is configured to retrieve monitoring data representing a selected portion of the network 1 from the monitoring data stored in the database 30, and provide this data to other components. In the context of the flow of processes of FIG. 1, the network portioning module 41 preferably contains code for executing the operations S103 and S121, among other operations.

The software code executed on the analysis controller 40 preferably includes a requirement evaluation module 42, which is configured to evaluate monitoring data representing any portion of the network 1, which has been provided by the network portioning module 41, and to detect a collective failure of the represented portion of the network 1 to meet a selected performance requirement such as a KPI. In the context of the flow of processes of FIG. 1, the requirement evaluation module 42 preferably contains code for executing the operations S105 and S107, among other operations.

The software code executed on the analysis controller 40 preferably includes at least one suppression module 43, which is configured to execute suppression of failure of a corresponding performance requirement in the network 1, preferably by transmitting instructions to the EMSs 21 and netconf controllers 22. In the context of the flow of processes of FIG. 1, the suppression module 43 preferably contains code for executing the operations S117 and S123, among other operations.

The software code executed on the analysis controller 40 preferably includes an iteration control module 44, which is configured to respond to the requirement evaluation module 42 detecting a collective failure of a portion of the network 1 to meet a selected performance requirement. The response of the iteration control module 44 is based on a comparison of the size of the failing portion of the network 1 to a predetermined size. If the failing portion is larger than the predetermined size, the iteration control module 44 selectively actuates the network portioning module 41 to provide monitoring data representing at least one subportion of the failing portion to the requirement evaluation module 42. If the failing portion is smaller than or equal in size to the predetermined size, the iteration control module 44 selectively actuates the suppression module 43 to execute suppression of failure upon the failing portion of the network 1. In the context of the flow of processes of FIG. 1, the configuration module 45 preferably contains code for executing the operations S109, S111, S113, S115, and S119, among other operations.

The software code executed on the analysis controller 40 preferably includes a configuration module 45, which is configured to select an initial portion of the network 1 and a performance requirement for the other modules to operate upon, and to supply the predetermined size. In the context of the flow of processes of FIG. 1, the configuration module 45 preferably contains code for executing the operation S101, among other operations.

Illustrative examples of GUI pages for filtering and presenting device compliance analysis results will now be described with reference to FIGS. 4A and 4B, according to an embodiment of the invention.

Figure 4A:
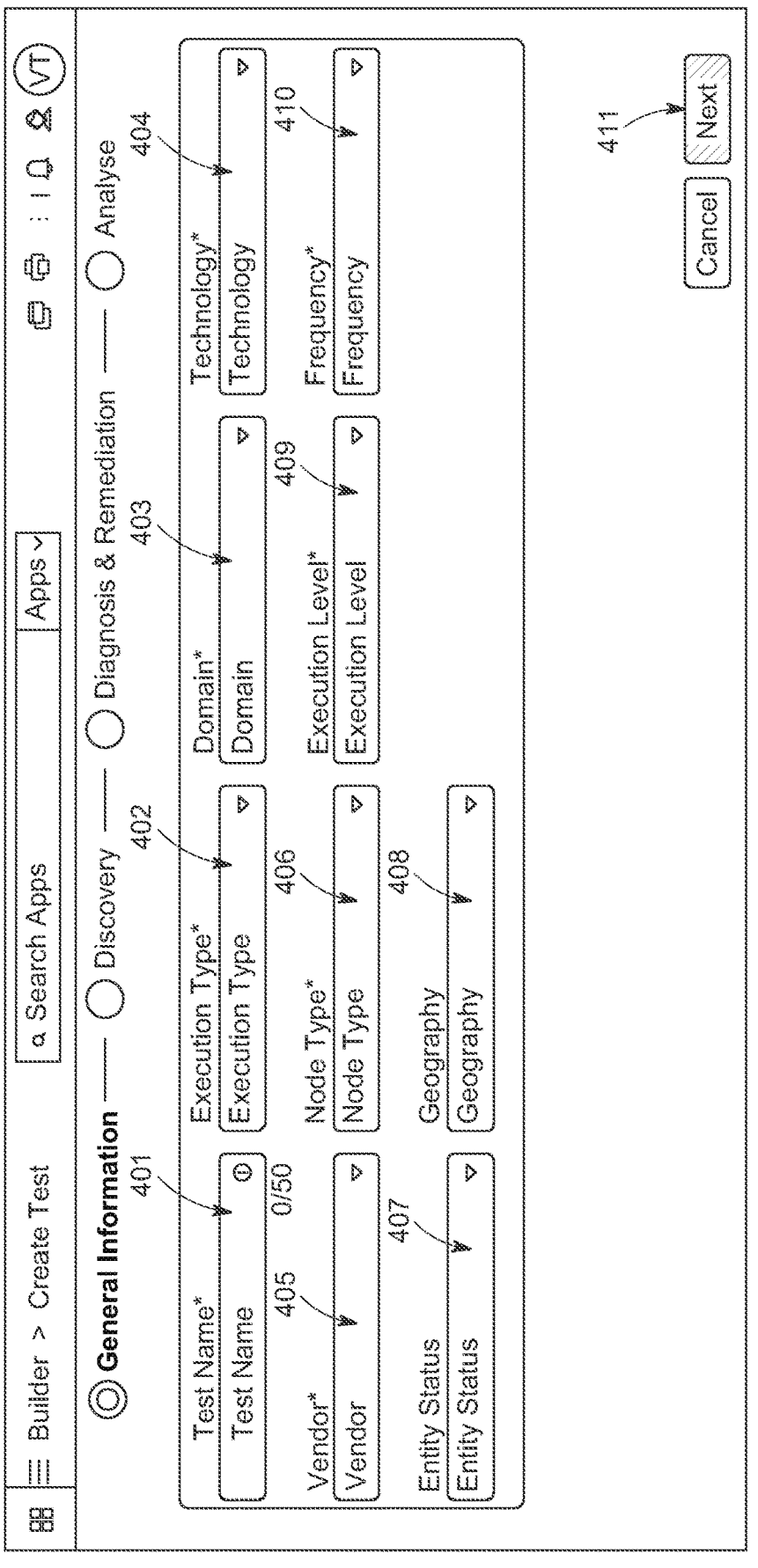
FIGS. 4A through 4C are depictions of an illustrative example of a graphic user interface for configuring systems and methods for diagnosis and suppression of a root cause of performance requirement failure in a network, in accordance with an exemplary embodiment of the present invention.

FIG. 4A depicts a simple illustrative page for configuring the applicable initial settings for a KPI or other performance test, using various fields, in the context of a mobile network.

Name field 401 permits text entry of an identifying name for the test.

Execution type field 402 permits the selection of the general nature of the divisions to be used. Options presented in the field 402 preferably include the names of other fields presented on the page; for example, Domain, Vendor, and Geography. The options can also include categories that cover multiple fields, such as Network Element (which covers Node Type and Domain). The identified field or fields are then locked from selection, as their value will be variable according to the iterations in the flow of processes.

Fields 403, 404, 405, 406, 407, and 408 effectively define the initial portion of the network according to multiple variables. Specifically:

Domain field 403 permits the selection of a domain of the network for consideration. Possible selections can include but are not limited to RAN, Transport, Core, and BSS.

Technology field 404 permits the selection of a communication technology for consideration; that is, consideration of devices and nodes that communicate using said technology for connection. Possible selections can include but are not limited to LTE and 5G.

Vendor field 405 permits the selection of a vendor for consideration; that is, consideration of devices and components manufactured or otherwise provided by said vendor. Possible selections preferably include each vendor with devices or components contributing to or communicating with the network.

Node type field 406 permits the selection of specific node types for consideration. Possible selections can include but are not limited to Macrocell, ODSC, IDSC, Micro VDU, VCU, and many others.

Entity status field 407 permits the selection of a particular status of the components for consideration. Possible selections can include but are not limited to On Air and Planned.

Geography field 408 permits the selection of a variety of geographic regions of at least one size or nature, such as nations, states/provinces/prefectures, counties, cities, or clusters.

Each of these fields preferably also permits the selection of an "all of the above/any" option, or assumes no limitation for the corresponding factor if the field is left unused. Each of these fields preferably also permits the selection of multiple options at once.

Execution level field 409 permits the selection of a scope of application of the performance test, and can range from nationwide to a selected city or other region. The selected scope will affect which KPIs can be tested. The execution level field 409 preferably also interacts with the geography field 408; for example, if the execution level field 409 is set to "City," then the selectable options in the geography field 408 are filtered to show only cities, removing geographic areas of smaller or larger scopes (such as clusters, counties, states/provinces/prefectures, and nations).

Frequency field 410 permits the setting of how often the performance test operates. Possible selections can include but are not limited to Daily, Hourly, and Every 15 Minutes.

Once all desired fields are set, a user can select the next button 411 to continue to the KPI selection page.

Figure 4B:
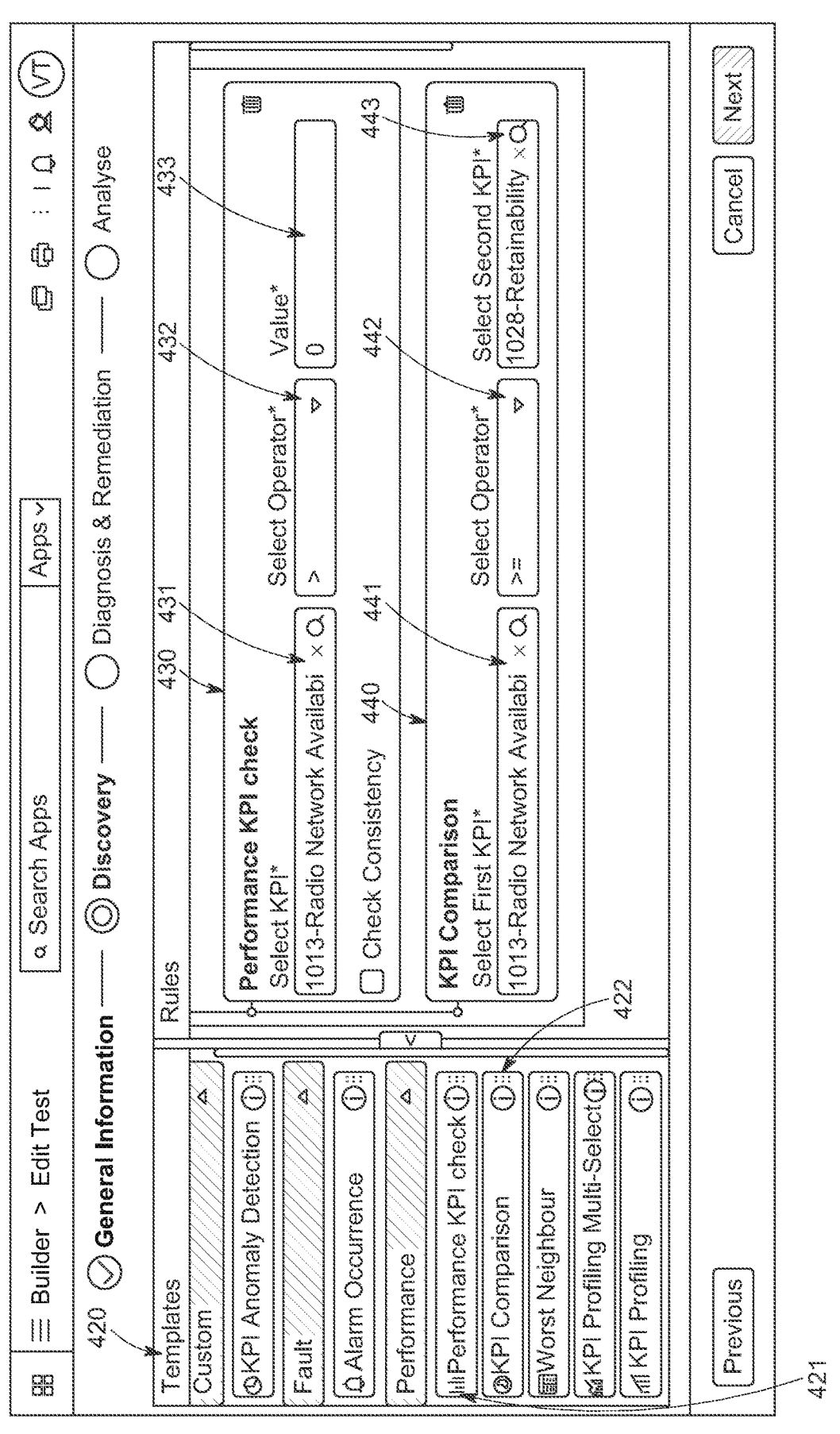

FIG. 4B depicts a simple illustrative page for selecting the KPI for testing, in the context of a mobile network.

Template menu 420 lists several KPI and other performance test templates. Each test template can be dragged and dropped for insertion into the initial condition test area 430 to the right, or into the dependent condition test area 440 below the initial condition test area 430.

As illustrated, the initial condition test area 430 has a "performance KPI check" test template 421 inserted, which provides a testing factor field 431, operator field 432, and value field 433. As illustrated, the testing factor is Radio Network Availability, the operator is Greater Than, and the value is 0. This illustrative test, as configured, will determine whether the Radio Network Availability in the network portion defined on the previous page is greater than zero; if not, the test fails at the initial portion level or initial KPI level.

If a configuration of how to divide the portions has been arranged, using the page of FIG. 4A or otherwise, the testing is conducted through a process such as illustrated for FIG. 1. The testing will iteratively evaluate the portions of the network against the illustrative test, according to the configured division methodology.

Alternatively, one or more possible source conditions (e.g. source performance requirements) of a failure of the test in the initial condition test area 430 can be defined in the dependent condition test area 440. For example, as illustrated, the dependent condition test area 440 has a "KPI comparison" test type 422 inserted, which provides a first testing factor field 441, operator field 442, and second testing factor field 443. As illustrated, the first testing factor is Radio Network Availability, the operator is Greater Than Or Equal To, and the second testing factor is Retainability.

The initial condition test set in the initial condition test area 430 is thereby being defined as a symptom, and the dependent condition test set in the dependent condition test area 440 is thereby being defined as a possible source of this symptom. Further tests can also be added to the dependent condition test area 440 as additional possible sources.

Figure 4C:
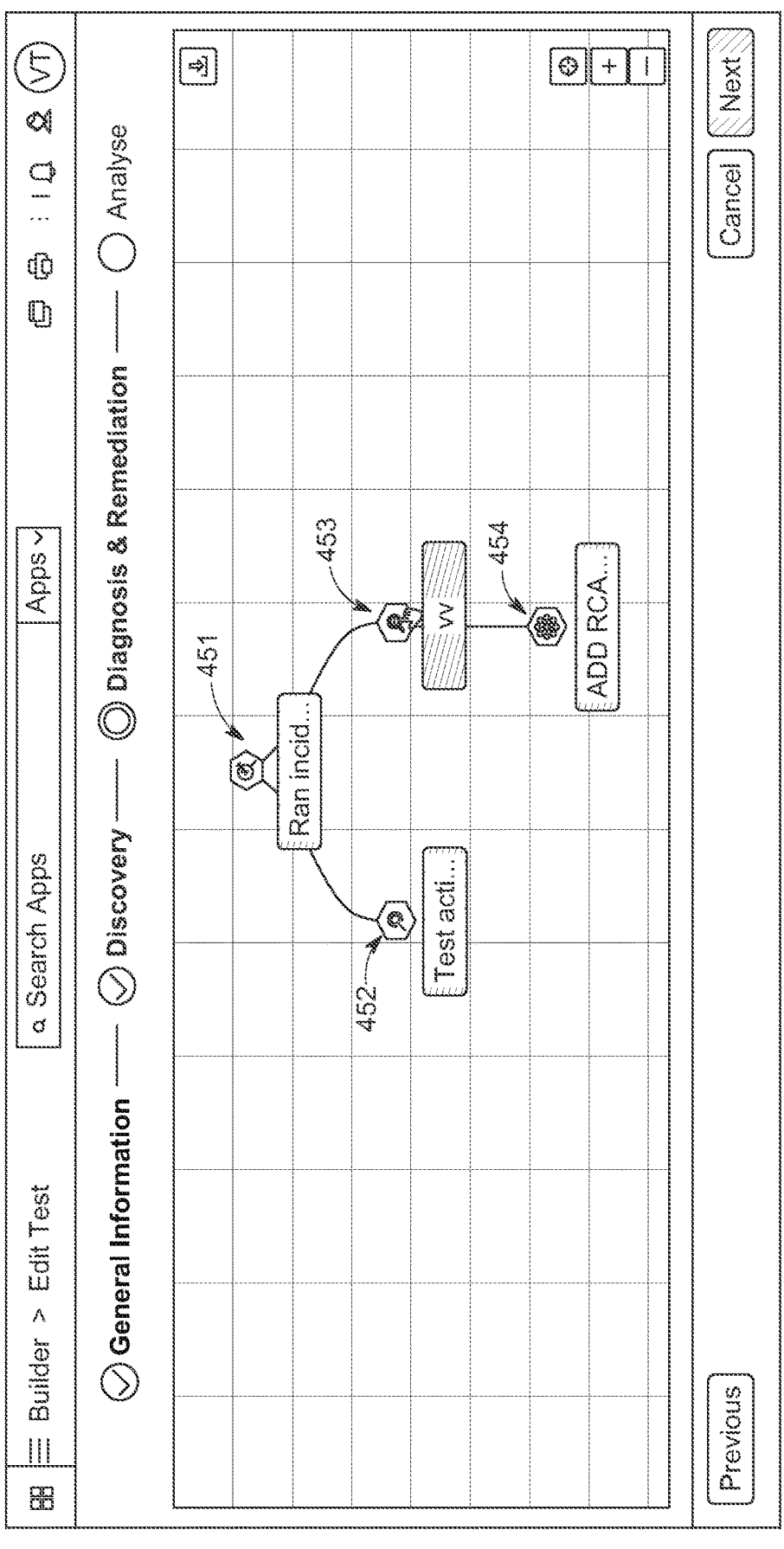

Further actuation of a dependent condition test in the dependent condition test area 440, by for example double-clicking on the test, will open a test hierarchy. FIG. 4C depicts a simple illustrative page for display of such a hierarchy, in the context of a mobile network. In the illustrative hierarchy, tests 452 and 453 each check for a different possible source of a failure of test 451, and test 454 checks for a possible source of test 453. Actuating any test in the hierarchy, by for example double-clicking on the test, will restore a page such as that of FIG. 4B, with the actuated test presented in the initial condition test area 430. Dependent condition tests for the actuated test—that is, tests for possible sources of failure of the actuated test—can then be added to the dependent condition test area 440.

If at least one dependent condition test has been set in the dependent condition test area 440, the testing is conducted through a process such as illustrated for FIG. 2. The testing will evaluate the defined network portion according to the initial condition test set in the initial condition test area 430, and if that test fails, will also evaluate the defined network portion according to some or all of the dependent condition tests set in the dependent condition test area 440. FIG. 5 is a diagram of components of one or more devices according to an embodiment. Device 500 may correspond to any computing device described above (such as the components of network elements 10, the EMSs 21 and netconf controllers 22, and the analysis controller 40), as well as to a processor executing any described software or method (such as the modules 41 through 45), and to a memory containing any described data storage (such as the database 30).

As shown in FIG. 5, the device 500 may include a bus 510, a processor 520, a memory 530, a storage component 540, an input component 550, an output component 560, and a communication interface 570. It is understood that one or more of the components may be omitted and/or one or more additional components may be included.

The bus 510 includes a component that permits communication among the components of the device 500. The processor 520 is implemented in hardware, firmware, or a combination of hardware and software. The processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 520 includes one or more processors capable of being programmed to perform a function.

The memory 530 includes a random access memory (RAM), a read only memory (ROM), and/or another type of dynamic or static storage device (e.g., a flash memory, a magnetic memory, and/or an optical memory) that stores information and/or instructions for use by the processor 520.

The storage component 540 stores information and/or software related to the operation and use of the device 500. For example, the storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 550 includes a component that permits the device 500 to receive information, such as via user input (e.g., a touch screen display, a keyboard, a keypad, a mouse, a button, a switch, and/or a microphone). The input component 550 may include a sensor for sensing information (e.g., a global positioning system (GPS) component, an accelerometer, a gyroscope, and/or an actuator).

The output component 560 includes a component that provides output information from the device 500 (e.g., a display, a speaker, and/or one or more light-emitting diodes (LEDs)).

The communication interface 570 includes a transceiver-like component (e.g., a transceiver and/or a separate receiver and transmitter) that enables the device 500 to communicate with other devices, such as via a wired connection, a wireless connection, or a combination of wired and wireless connections. The communication interface 570 may permit device 500 to receive information from another device and/or provide information to another device. For example, the communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

The device 500 may perform one or more processes described herein. The device 500 may perform operations based on the processor 520 executing software instructions stored by a non-transitory computer-readable medium, such as the memory 530 and/or the storage component 540. A computer-readable medium is defined herein as a non-transitory memory device. A memory device includes memory space within a single physical storage device or memory space spread across multiple physical storage devices.

Software instructions may be read into the memory 530 and/or the storage component 540 from another computer-readable medium or from another device via the communication interface 570. When executed, software instructions stored in the memory 530 and/or storage component 540 may cause the processor 520 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of diagnosis and suppression of a root cause of performance requirement failure in a network, the method comprising:

evaluating at least a network portion to detect a failure of the network portion to meet an initial predefined performance requirement, the initial predefined performance requirement being thereby identified as a failing performance requirement;

iteratively:

identifying possible cause performance requirements of the failing performance requirement, and evaluating the network portion against each of the possible cause performance requirements to identify a failure of the network portion to meet one of the possible cause performance requirements, the failing performance requirement being thereby updated, for a later iteration of the identifying and evaluating, to be the one of the possible cause performance requirements that the network portion failed to meet; and suppressing a root cause of the failure of the network portion to meet the initial performance requirement upon identification of the root cause.

2. The method of claim 1, wherein the root cause of the failure of the network portion is identified as the failing performance requirement upon failure to identify at least one possible cause performance requirement of the failing performance requirement.

3. The method of claim 1, wherein the at least the network portion is determined by:

evaluating an initial portion of a network to detect a collective failure of the initial network portion to meet the initial predefined performance requirement, the initial network portion being thereby identified as a failing network portion; and iteratively dividing the failing network portion and evaluating subportions thereof for collective failure to meet the initial predefined performance requirement, and thereby identify a failing network portion of smaller size for a later iteration of division, until a failing network portion of smallest size is determined as the at least the network portion to be evaluated.

4. The method of claim 3, wherein the failing network portion is divided into subportions of a predetermined size or smaller, the at least the network portion to be evaluated being identified as a subportion of the predetermined size or smaller which is determined to fail to meet the initial predefined performance requirement.

5. The method of claim 4, wherein the predetermined size is predetermined in association with the performance requirement.

6. The method of claim 4, wherein the predetermined size is defined in terms of a number of network nodes.

7. The method of claim 4, wherein the predetermined size is defined in terms of a number of network elements.

8. The method of claim 3, wherein at least one iteration of the iteratively dividing is a division by geographic region.

9. The method of claim 3, wherein at least one iteration of the iteratively dividing is a division by vendor.

10. A system for efficient identification and suppression of performance requirement failure in a network, the system comprising:

a database implemented in a computer memory and configured to store monitoring data describing behavior of a network; and at least one processor configured to:

evaluate monitoring data, from among the stored monitoring data, representing at least a network portion to detect a failure of the network portion to meet an initial predefined performance requirement, the initial predefined performance requirement being thereby identified as a failing performance requirement;

iteratively:

identifying possible cause performance requirements of the failing performance requirement, and evaluating the network portion against each of the possible cause performance requirements to identify a failure of the network portion to meet one of the possible cause performance requirements, the failing performance requirement being thereby updated, for a later iteration of the identifying and evaluating, to be the one of the possible cause performance requirements that the network portion failed to meet; and suppressing a root cause of the failure of the network portion to meet the initial performance requirement upon identification of the root cause.

11. The system of claim 10, wherein the at least one processor is further configured to determine the at least the network portion by:

evaluating an initial portion of a network to detect a collective failure of the initial network portion to meet the initial predefined performance requirement, the initial network portion being thereby identified as a failing network portion; and iteratively dividing the failing network portion and evaluating subportions thereof for collective failure to meet the initial predefined performance requirement, and thereby identify a failing network portion of smaller size for a later iteration of division, until a failing network portion of smallest size is determined as the at least the network portion to be evaluated.

12. The system of claim 11, wherein the failing network portion is divided into subportions of a predetermined size or smaller, the at least one network portion to be evaluated being identified as a subportion of the predetermined size or smaller which is determined to fail to meet the initial predefined performance requirement, and wherein the predetermined size is predetermined in association with the performance requirement.

13. The system of claim 11, wherein the failing network portion is divided into subportions of a predetermined size or smaller, the at least one network portion to be evaluated being identified as a subportion of the predetermined size or smaller which is determined to fail to meet the initial predefined performance requirement, and wherein the predetermined size is defined in terms of a number of network nodes.

14. The system of claim 11, wherein the failing network portion is divided into subportions of a predetermined size or smaller, the at least one network portion to be evaluated being identified as a subportion of the predetermined size or smaller which is determined to fail to meet the initial predefined performance requirement, and wherein the predetermined size is defined in terms of a number of network elements.

15. The system of claim 11, wherein at least one iteration of the iteratively dividing is a division by geographic region within the failing portion.

16. The system of claim 11, wherein at least one iteration of the iteratively dividing is a division by vendor within the failing portion.

17. A non-transitory computer-readable recording medium having recorded thereon instructions executable by at least one processor to perform a method of diagnosis and suppression of a root cause of performance requirement failure in a network, the method including:

evaluating at least a network portion to detect a failure of the network portion to meet an initial predefined performance requirement, the initial predefined performance requirement being thereby identified as a failing performance requirement;

iteratively:

identifying possible cause performance requirements of the failing performance requirement, and evaluating the network portion against each of the possible cause performance requirements to identify a failure of the network portion to meet one of the possible cause performance requirements, the failing performance requirement being thereby updated, for a later iteration of the identifying and evaluating, to be the one of the possible cause performance requirements that the network portion failed to meet; and suppressing a root cause of the failure of the network portion to meet the initial performance requirement upon identification of the root cause.

18. The recording medium of claim 17, wherein the at least the network portion is determined by:

evaluating an initial portion of a network to detect a collective failure of the initial network portion to meet the initial predefined performance requirement, the initial network portion being thereby identified as a failing network portion; and iteratively dividing the failing network portion and evaluating subportions thereof for collective failure to meet the initial predefined performance requirement, and thereby identify a failing network portion of smaller size for a later iteration of division, until a failing network portion of smallest size is determined as the at least the network portion to be evaluated.

19. The recording medium of claim 18, wherein the failing network portion is divided into subportions of a predetermined size or smaller, the at least the network portion to be evaluated being identified as a subportion of the predetermined size or smaller which is determined to fail to meet the initial predefined performance requirement.

20. The recording medium of claim 19, wherein the predetermined size is predetermined in association with the performance requirement, and wherein at least one iteration of the iteratively dividing is a division by geographic region or a division by vendor.

\* \* \* \* \*